Aug. 25, 1964     A. J. GRENIER     3,146,378

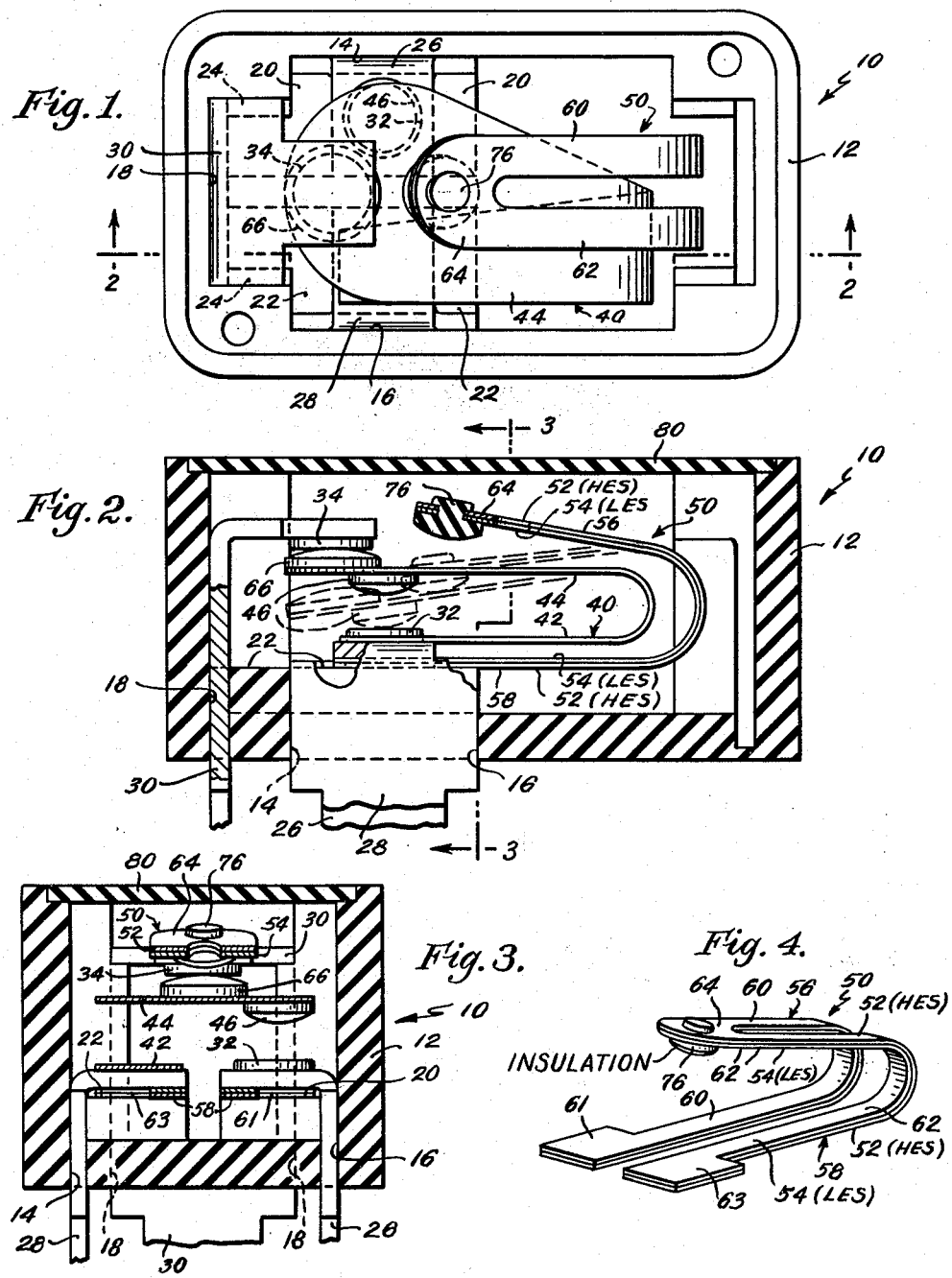

THERMAL RELAYS

Filed July 29, 1959     3 Sheets-Sheet 2

Inventor,
Aimé J. Grenier,
by Harold Levine
Att'y.

Aug. 25, 1964     A. J. GRENIER     3,146,378
THERMAL RELAYS
Filed July 29, 1959     3 Sheets-Sheet 3
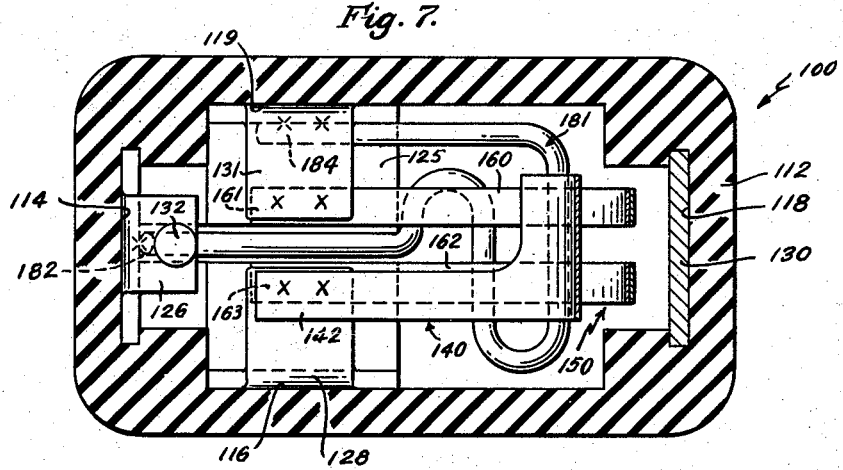
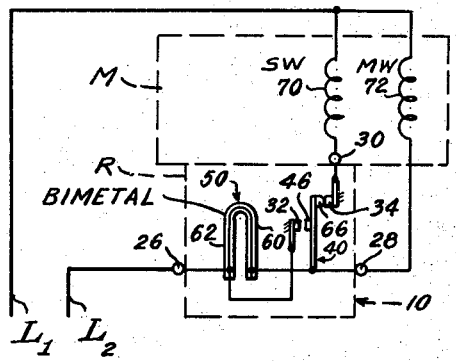
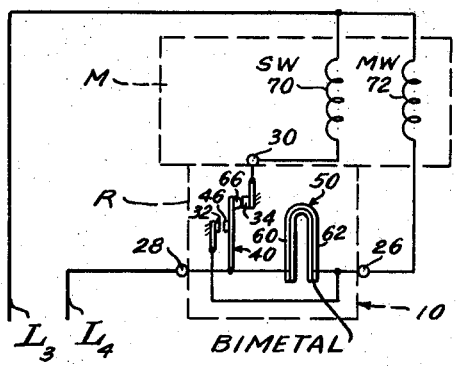
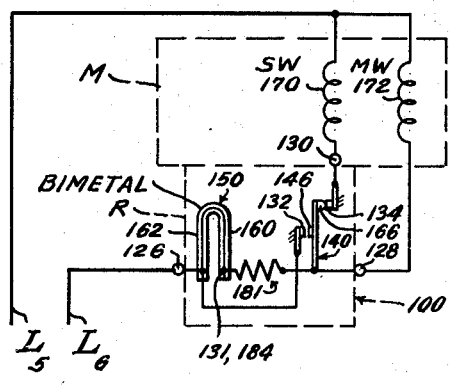
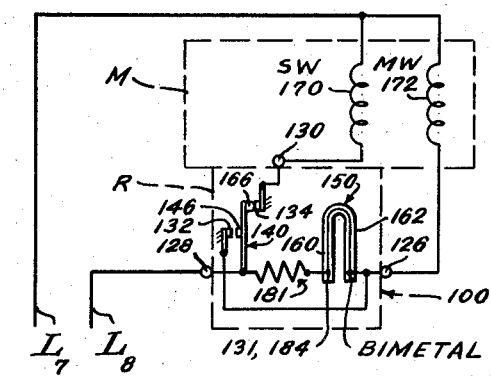
Inventor,
Aimé J. Grenier,
by Harold Levine
Att'y.

United States Patent Office 3,146,378
Patented Aug. 25, 1964

3,146,378
THERMAL RELAYS
Aime J. Grenier, North Attleboro, Mass., assignor to Texas Instruments Incorporated, Dallas, Tex., a corporation of Delaware
Filed July 29, 1959, Ser. No. 830,221
12 Claims. (Cl. 317—13)

The invention relates to thermal protective devices, and more particularly, to thermal time delay relays. The relays of the instant invention are especially suited for, though not limited to, protecting the start or phase windings of split-phase electric motors. The start or phase winding is generally of a fine high-resistance wire and generally can withstand continuous operation for only a short time. It is therefore important that a protective device for a split-phase motor should not permit the start winding to be subjected to currents for a damaging length of time or those which are excessively high. The start winding relay must be effective to de-energize the start winding in the short time specified for the particular motor and make it impossible for the start winding to become re-energized at an improper time.

It is one object of the invention to provide a thermal time-delay relay which will accomplish the above objectives.

It is another object to provide a thermal time-delay relay which is adapted for miniaturization, is simple and inexpensive to manufacture and yet dependable in the performance of its functions.

It is another object to provide a relay which can be versatilely employed in a plurality of circuit arrangements for protecting the start windings so as to make the relay of the instant invention applicable to protecting motors having start-to-main winding current ratios which are high and also for motors in which this ratio is relatively low.

It is another object to provide a thermal relay which employs an electrically conducting thermostatic bimetal element which is self-protecting and is operative to shunt itself out to prevent overheating thereof.

It is another object to provide a thermal time-delay relay for the purposes described which affords a quick reset.

Among the further objects of the instant invention are the provisions of a thermal time-delay relay which is durable, accurate, reliable in operation, adapted for miniaturization, compact, and which is versatile and susceptible to varying electrical ratings and diverse applications, which embodies a minimum number of parts, and which is simple and economical to assemble and manufacture.

Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated:

FIG. 1 is a top plan view, with cover removed, of a thermal relay according to a first embodiment of the instant invention;

FIG. 2 is a sectional view taken substantially on line 2—2 of FIG. 1, which follows the inner edge of the casing;

FIG. 3 is a sectional view taken on line 3—3 of FIG. 2;

FIG. 4 is a perspective view of a thermostatic bimetal element common to each of the species of FIGS. 1–3 and 5–7;

FIG. 7 is a sectional view taken on line 7—7 of FIG. 5;

Figure 5:
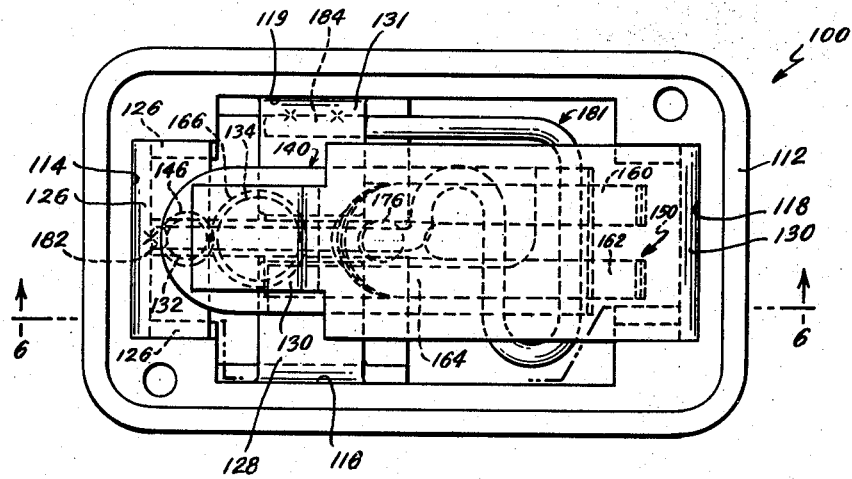
FIG. 5 is a top plan view, with cover removed, of a relay according to a second embodiment of the instant invention.
Figure 6:
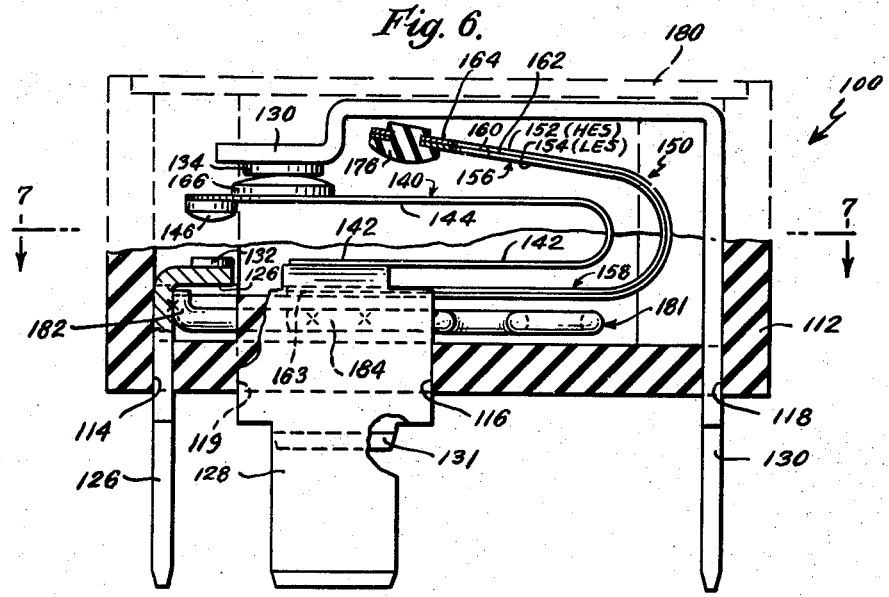
FIG. 6 is a view similar to FIG. 5 taken on line 6—6 of FIG. 7.

FIGS. 8 and 9 are wiring diagrams for the relay illustrated in FIGS. 1–4 in combination with a split-phase electric motor; and FIGS. 10 and 11 are wiring diagrams similar to FIGS. 8 and 9 for the thermal relay illustrated in FIGS. 5–7.

Dimensions of certain of the parts as shown in the drawing have been modified for the purposes of clarity of illustration.

Referring now to the drawings, there is illustrated in FIGS. 1–3, a thermal time-delay relay according to a first embodiment of the instant invention generally referred to by numeral 10. Thermal relay 10 includes a casing member 12 formed of one of the conventional electrically insulating plastics such as a moldable phenolic resinous material. Casing member 12 is provided with a plurality of vertically open-ended slots 14, 16 and 18 opening exteriorly of casing member 12 (as best seen in FIGS. 2 and 3) and a plurality of shoulders 20, 22 and 24 adjacent thereto which co-operatively interfit with and mount respectively, electrically conducting terminals 26, 28 and 30. Terminal 26 is provided with a stationary electrical contact 32 fixedly mounted on and electrically connected to the upper surface thereof. Terminal 30 mounts a fixed electrical contact 34 which is electrically connected thereto, as shown.

Thermal relay 10 includes an electrically conducting switch or shunt means generally indicated at 40, which may be formed of a conventional, electrically conducting spring material such as a beryllium copper or phosphor bronze alloy. Switch means 40 comprises a U-shaped member (as seen in elevation in FIG. 2) and includes a lower leg 42 and an upper leg 44. Lower leg 42 is electrically connected at one end to and mounted on terminal 28, as best seen in FIGS. 1 and 3. Upper leg 44 has mounted at one end thereof, on its lower surface, an electrical contact 46 for engagement with contact 32, and on its upper surface, an electrical contact 66 for engagement with contact 34, as shown. Upper leg 44 is spring biased to a position in which contacts 34 and 66 are normally closed and contacts 46 and 32 are normally open. Normally closed contacts 34 and 66, as will be discussed more fully below, are generally the start winding contacts in a circuit for the protection of the start or phase winding of a split-phase electric motor.

Thermal relay 10 is further provided with a thermally responsive member generally indicated at 50, which may be formed of a conventional thermostatic material such as bimetal formed of two layers 52 and 54 having unequal coefficients of thermal expansion, with outer layer 52 having the higher coefficient of expansion. Layers 52 and 54, which are respectively the high and low expansion layers, are respectively represented on the drawings by HES and LES.

The bimetal element shown in perspective in FIG. 4 is common to each of the embodiments of the thermal relay shown in FIGS. 1–3 and 5–7. Bimetal element 50 is U-shaped in elevation, as seen in FIGS. 2 and 4, and includes upper and lower portions indicated generally by numerals 56 and 58. Bimetal element 50 is also substantially U-shaped, as seen in plan view in FIG. 1, and includes legs 60 and 62, as best seen in FIGS. 1 and 4. Leg 62 is electrically connected at one end 63 to and mounted on terminal 28 at the lower side thereof and rests on shoulder 22 of casing 12, as best seen in FIG. 3. One end 61 of leg 60 is electrically connected to and mounted on terminal 26 at the lower side thereof and rests on shoulder 20 of casing 12, as best seen in FIG. 3. The other ends of each of legs 60 and 62 meet at an intermediate or bight portion 64. Fixedly mounted on bight portion 64 is an abutment 76 formed of electrically insulating material, such as for example, nylon or Teflon (the latter being a registered trademark to E. I. du Pont de Nemours & Co. for a plastic consisting of a tetrafluoroethylene polymer). Abutment 76 is adapted to engage the upper surface of shunt member 40 to move the latter in response to movement of the thermal element 50 at predetermined temperature and current conditions so as to initially open the normally closed contacts 34 and 66 and upon continued movement thereof, to thereafter close normally open contacts 46 and 32 for a purpose later to be described.

In practice, terminals 28 and 26, shunt or switch means 40, bimetal element 50, contact 66 and contacts 32 and 46 are preassembled as a subassembly which is slidably inserted into casing 12, after which terminal 30, carrying contact 34, is slidably inserted into slot 18 of casing 12 and securely fastened in place by staking or other means (not shown). Thereafter, the open end of the casing member 12 is closed with a cover member 80, as shown, and is secured to casing member 12 in any convenient known manner, such as by gluing, bolting, etc. (not shown).

The thermal relay thus far described, as illustrated in FIGS. 1–3, is especially adapted for use as a protective device for a split-phase electrical motor having an auxiliary phase winding or a start winding and a main winding.

Referring now to the circuit diagrams of FIGS. 8 and 9, the thermal relay 10 is schematically illustrated in circuits with a motor having an auxiliary start or phase winding 70 and a main winding 72.

Referring now specifically to FIG. 8, terminal 26 of thermal relay 10 is electrically connected to $L_2$, one side of a power source. Terminal 30 is electrically connected in series with start or phase winding 70 and terminal 28 is electrically connected in series with main winding 72. Normally closed contacts 34 and 66 are connected in series with start winding 70 through terminal 30. Legs 60 and 62 of bimetal member 50 are connected in series with the main winding 72 through terminal 28 and normally open shunting contacts 32 and 46 are connected in shunt across legs 60 and 62 and thus shunt contacts 32 and 46 are also connected in series with main winding 72 through terminal 28. As shown in FIG. 8, the bimetal element 50 carries both the start and main winding currents when start contacts 34 and 66 are closed. In this condition, both legs 62 and 60 each carry both the start and main winding currents thereby providing uniform heating throughout the entire bimetal element since each of legs 60 and 62 have equal electrical resistance and are carrying equal amounts of current. When start contacts 34 and 66 are separated, and shunt contacts 32 and 46 are open, both legs 62 and 60 of bimetal element 50 will carry only main winding or line current.

Referring now to FIG. 9, terminal 28 is electrically connected to $L_4$, one side of a power source. Terminal 30 is connected in series with the start winding 70 and terminal 26 is connected in series with main winding 72. In the circuit of FIG. 9, bimetal element 50 carries only the main winding current in each of legs 60 and 62, irrespective of whether start contacts 34 and 66 are open or closed. Legs 60 and 62 of bimetal member 50 are connected in series with main winding 72 through terminal 26 and normally open shunt contacts 32 and 46 are connected in shunt across legs 60 and 62 and thus shunt contacts 32 and 46 are also connected in series with main winding 72 through terminal 26. Normally closed contacts 34 and 66 are electrically connected in series with start winding 70 through terminal 30.

The operation of thermal relay 10 is substantially as follows. When the circuit, as shown in FIG. 8, is energized, the bimetal element 50 will be heated by both the start and main winding currents and the bimetal element will move downwardly (as viewed in FIG. 2) and shown in the dashed line portions, in response to the heat derived from the start and main winding currents passing therethrough so as to cause abutment 76 to engage and move leg 44 of shunt means 40 downwardly to open normally closed start contacts 34 and 66 and thereby de-energize the start winding within the required very short time as the motor comes up to speed. In the condition where normally closed start contacts 34 and 66 are open, and normally open shunting contacts 32 and 46 are open, the main winding or line current will continue to flow through bimetal element 50. As bimetal element 50 continues being heated by the main winding current flowing therethrough after start contacts 34 and 66 are broken, it will continue to move downwardly along with leg 44 of shunt member 40 and urge normally open contacts 32 and 46 into engagement to shunt out and thereby protect, bimetal element 50 from overheating. After shunt contacts 32 and 46 are closed, thereby shunting the main winding current out of the bimetal element 50, bimetal element 50 will cool, move upwardly (as seen in FIG. 2), and permit shunting contacts 32 and 46 to open under the spring bias of leg 44 of shunt means 40 and thereby cause the main winding current to again flow through the bimetal element and result in further heating thereof. This further heating causes the bimetal element to move in a direction to again close shunt contacts 46 and 32 before the bimetal element 50 has cooled and moved upwardly sufficiently (as viewed in FIG. 2) to close start contacts 34 and 66. This cyclic action continues as long as the motor is energized. Shunting contacts 46 and 32, in cycling between a contacts-open and -closed position, while start contacts 66 and 34 are open, are effective to maintain thermally responsive means 50 at a lower temperature which is just slightly above the reset temperature of the device (that is, that temperature at which thermally responsive means 50 will cause or permit closing of start contacts 66 and 34 to re-energize the start winding). The shunting contacts 46 and 32, by co-operating with thermally responsive means 50 to maintain the latter at this lower temperature, advantageously afford a quick reset of the device. In the event that there is an oxide film between shunting contacts 32 and 46 which prevents effective shunting of bimetal element 50, the latter will, in this condition, continue to bear and push harder against shunt member 40 (as best seen in FIG. 3). Since the point of application of the force of the bimetal element 50 in pushing against the shunt member 40 is eccentric with respect to the contacts 32 and 46 (as seen in FIG. 3), rotation of contact 46 with respect to contact 32 will occur upon the application of additional pushing force by bimetal 50. This rotation is effective to break apart barrier oxide films which may have formed between the shunting contacts and thus advantageously provides a wiping contacts cleaning action.

Thus, it is seen from the above, the bimetal element 50 is effective to de-energize the start winding and is also effective to protect itself from overheating and maintain itself at a temperature just slightly above the reset temperature by causing shunting contacts 32 and 46 to close to shunt out the main winding current in the bimetal element 50, as described above. Once having opened the start contacts 34 and 66, bimetal element 50 will maintain the start contacts 34 and 66 in an open condition while current flows through the main winding and will hunt between a position in which both start contacts 34 and 66 and shunt contacts 32 and 46 are open and a position in which start contacts 34 and 66 are open and shunt contacts 32 and 46 are closed. The above is equally applicable to each of the circuits of FIGS. 8 and 9. The circuits of FIGS. 8 and 9 differ mainly in that in the circuit of FIG. 8 the bimetal element carries line current, e.g. both start and main winding currents when start contacts 34 and 66 are closed, whereas in the circuit of FIG. 9, the bimetal element carries only main winding current.

Thermal relay 10, as well as the thermal relay in the further embodiment to be described below, can also be constructed so as to provide a quick reset of the start contacts by calibrating the bimetal element for a high operating temperature so that the bimetal element will cool quickly. By calibrating the bimetal element 50 for a high operating temperature, the operation of the relay is thereby made relatively independent of minor changes in ambient temperature.

The bimetal element 50 of relay 10, as well as that of the relay in FIGS. 5–7 to be described below, being U-shaped as best seen in FIG. 2 (as defined by portions 56 and 58), affords the advantageous result of permitting a much smaller constructed, miniaturized switch and yet provides substantially greater thermal activity and thermal force per unit change in temperature than that which could be obtained with a bimetal element in a straight cantilever or strip form in the same size miniaturized switch. A cantilever bimetal strip providing the same thermal activity and thermal force as that of U-shaped bimetal element 50 would require a switch structure of a size substantially greater than that required for the U-shaped bimetal element 50. Another advantage of the U-shaped element 50 over a cantilever strip bimetal element of the same length is that the former provides the same electrical resistance as the latter, but can be employed in a much smaller, miniaturized switch construction. The increased force of U-shaped bimetal element 50 is particularly useful in tending to break apart any welds which may be formed between start contacts 34 and 66.

The shunt or switching element 40, because of its U-shape, also permits miniaturization of the switch and is more sensitive and responsive to movement of the bimetal element 50 and requires little or minimum thermal force of movement by the bimetal element to cause opening of normally open start contacts and cause shunting or closing of normally open contacts 32 and 46. The combined lengths of legs 42 and 44 provides a long fulcrum arm about the fulcrum point at the connection of leg 42 to terminal 28 so as to permit a minimum force by the bimetal abutment therewith to cause movement of shunt means 40.

Since both legs 60 and 62 of bimetal member 50 have equal electrical resistance, if the current flow through each leg was not equal, there could be differential vertical movement of legs 60 and 62 due to differential heating thereof which could result in an undesirable twisting movement. In such condition, the cooler leg of the bimetal would impede vertical movement of the other leg and would reduce the efficiency of the thermally responsive means. The fact that the bimetal element 50 affords equal current distribution in both legs 60 and 62 thereof thereby permitting uniform heating throughout the bimetal substantially limits movement of both legs of the bimetal in response to change in temperature thereof in concert to a reciprocally vertical direction, as viewed in FIG. 2.

Thermal relay 10 can be employed in a plurality of circuit arrangements such as illustrated, for example, in the two exemplary circuits shown in FIGS. 8 and 9 wherein the bimetal is connected either on the line or main winding sides, (i.e. terminals 28 and 26 can each be selectively connected to the line side or main winding side). The instant invention thus provides a thermal relay of versatility which is applicable to protect motors which have a high start-to-main winding current ratio and also motors which have relatively low start-to-main winding current ratios. Where the thermal relay is employed with a motor which has a high start-to-main winding current ratio, and it is desired to have a quick break of start contacts or a short operating time, terminal 26 would be connected to line to enable bimetal element 50 to carry both start and main winding currents when start contacts 34 and 66 are closed. Consequently, from the above, it is seen that the thermal relay 10 can be employed so as to provide varying operating times on the same motor by varying the type of circuit employed.

From the above, it is seen that thermal relay 10 provides a miniaturized, reliable, simply constructed, low-cost device with a minimum number of parts which is reliable in operation and wherein the bimetal element serves the dual function of de-energizing the start winding and of self-protection from overheating by the main winding current passing therethrough, and maintaining its temperature just slightly above the reset temperature by shunting itself out, as described above.

Illustrated in FIGS. 5–7, 10 and 11 is another embodiment of the thermal relay of the instant invention. Thermal relay 100, as illustrated in FIGS. 5–7, is similar to thermal relay 10, illustrated in FIGS. 1–3, and includes parts which may be substantially identical with corresponding parts of the thermal relay as shown in FIGS. 1–3. In this regard, a numeral of the 100 series refers to a part substantially identical to a part in the FIGS. 1–3 embodiment which has a reference numeral corresponding to the last two digits of the particular 100 series number, except as pointed out hereinafter. It will be understood that the broken-away portion of the thermal relay as shown in FIG. 7 is or may be of the same form as that of the portions included in the thermal relay as shown in FIG. 2.

Thermal relay 100 is provided with a casing member 112, a cover member 180, terminals 126, 128 and 130, stationary electrical contact 132, switch means or shunt means 140 and electrical contact 146, bimetal element 150, and insulating abutment member 176, each of which are or may be substantially identical to their respective counterparts in thermal relay 10 described above, except as pointed out hereinafter.

Casing member 112 is provided with a plurality of vertically open-ended slots 114, 116, 118 and 119 opening exteriorly of casing member 112 (as best seen in FIG. 7), and a plurality of shoulders 120, 122, 124 and 125 adjacent thereto which co-operatively interfit with and mount respectively electrically conducting terminals 126, 128, 130 and 131. Terminal 126 is provided with a stationary electrical contact 132 fixedly mounted and electrically connected to the upper surface thereof. Terminal 130 mounts a fixed electrical contact 134 at its extreme end portion at the lower surface thereof as best seen in FIG. 6. Thermal relay 100 includes an electrically conductive switch means or shunt means generally indicated at 140 which is substantially similar to switch or shunt means 40 of the thermal relay illustrated in FIGS. 1–3. Switch or shunt means 140 comprises a U-shaped member, as best seen in FIG. 7, having one leg 142 electrically connected to terminal 128 and its other leg 144 carrying an electrical contact 166 at the upper surface thereof for engagement with contact 134 and also carrying at the lower surface of leg 144 a contact 146 for movement into and out of engagement with contact 132. Contacts 132 and 146 constitute a pair of normally open shunt contacts corresponding to shunt contacts 32 and 46 of thermal relay 10. Contacts 134 and 166 constitute a pair of normally closed start winding contacts corresponding to contacts 34 and 66 of thermal relay 10 described above. Leg 144 spring biases contacts 134 and 166 into a normally closed position and contacts 146 and 132 into a normally open position. Bimetal element 150 is substantially U-shaped, as seen in plan view in FIG. 5; and includes legs 160 and 162, as best seen in FIG. 5. Leg 162 is electrically connected at one end of terminal 128 at the lower side thereof. One end 161 of leg 160 is electrically connected to stub or shortened terminal 131. The remainder of the bimetal element 150, including the insulated abutment 176, is substantially identical to bimetal 50 described above for relay 10.

Thermal relay 100 is further provided with an electrical heating means 181 which is electrically connected as by welding at one end 182 to terminal 126 and at its other end 184 to terminal 131. Terminal 131 comprises a stub or shortened terminal and provides a common connection of the bimetal element 150 to heater 181.

As clearly shown in FIG. 7, heater 181 is directly positioned beneath thermal element 150 so as to be in good heat-transfer relation thereto. Heater 181 provides the added advantages of enabling the construction of a low-current rated relay and the heater assures that the start contacts, once broken, will not be closed until the main winding is de-energized by providing heat to the bimetal generated by the main winding current passing through the heater in addition to that generated by the internal resistance of the bimetal and the current passing therethrough.

Thermal relay 100 is schematically illustrated in a circuit with a motor having an auxiliary or phase winding 170 and a main winding 172. The circuits illustrated in FIGS. 10 and 11 correspond respectively to the circuits illustrated in FIGS. 8 and 9 and differ substantially only in the inclusion of a heater 181, as shown.

Referring now to the circuit diagram of FIGS. 10–11, thermal relay 100 is schematically illustrated in a circuit with a motor having an auxiliary or phase winding 170 and a main winding 172.

Referring now specifically to FIG. 10, terminal 126 of thermal relay 100 is electrically connected to $L_6$, one side of a power source. Terminal 130 is electrically connected in series with start or phase winding 170 and terminal 128 is electrically connected in series with main winding 172. Normally closed contacts 134 and 166 are electrically connected in series with start winding 170 through terminal 130. Heater 181 and legs 160 and 162 of bimetal element 150 are connected in series with each other and in series with main winding 172 through terminal 128. Normally open shunting contacts 132 and 146 are connected in parallel with or in shunt across the series connected heater 181 and legs 160 and 162 of bimetal element 150 and thus normally open shunt contacts 132 and 146 are also connected in series with main winding 172 through terminal 128. As shown in FIG. 10, when the start contacts 134 and 166 are closed, heater 181 and the bimetal element 150 carry both the start and main winding currents with both legs 162 and 160 having equal current flow therethrough. When start contacts 134 and 166 are separated, and shunt contacts 132 and 146 are open, both legs 162 and 160 of bimetal element 150 and heater 181 will carry the main winding or line current.

Referring now to FIG. 11, terminal 128 is electrically connected to $L_8$, one side of a power source. Terminal 130 is connected in series with start winding 170 and terminal 126 is connected in series with main winding 172. In the circuit of FIG. 11, when start contacts 134 and 166 are closed, both legs 160 and 162 of bimetal element 150 and heater 181 carry the main winding current. Legs 160 and 162 of bimetal element 150 and heater 181 are connected in series with each other and in series with main winding 172 through terminal 126, and normally open shunt contacts 132 and 146 are electrically connected in shunt across the series connected legs 160 and 162 and heater 181 and thus shunting contacts 132 and 146 are also connected in series with main winding 172 through terminal 126.

The operation of thermal relay 100, in each of these circuits, is substantially the same as that described above for thermal relay 10, except as noted below.

As pointed out above, heater 181 provides additional advantages not available in the thermal relay 10. The bimetal element 150, after causing separation of start contacts 134 and 166 in the manner described above with regard to thermal relay 10, is effective to close normally open shunt contacts 132 and 134 in response to movement thereof by heat generated internally by the bimetal due to the main winding current flowing therethrough and by heat generated by the heater 181. Normally open shunt contacts 132 and 146, upon being closed, are effective to shunt out both heater 181 and bimetal element 150. Upon cooling of bimetal element 150, shunt contacts 132 and 146 will open in response to the spring bias of leg 144 of switch means 140. Once start contacts 134 and 166 are open, or separated, bimetal element 150 will hunt between a position in which the start contacts 134 and 166 are open and shunt contacts 132 and 146 are open, and a position in which start contacts 134 and 166 are open and normally open shunt contacts 132 and 146 are closed, in a manner similar to that described above for thermal relay 10. This cyclic action continues as long as the motor is energized.

In addition to the advantages described above, thermal relay 100 additionally provides substantially all of the unusual and advantageous beneficial results described above for thermal relay 10.

In view of the above, it will be seen that the several objects of the invention are achieved and other advantageous results attained.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

I claim:

1. A control means for an electric motor having main and phase windings; including an electrothermal means and a switch means connectable in series with the phase winding, said switch means being mounted for movement relative to and engageable by said electrothermal means to de-energize said phase winding when said electrothermal means moves in one direction upon being heated to a predetermined amount by current flowing therethrough, said electrothermal means also being connectable in series with said main winding; shunt means connected in parallel with said electrothermal means and connectable in series with said main winding adapted to shunt out said entire electrothermal means in response to further movement of the latter in said one direction upon being heated to another predetermined amount by the main winding current after said start winding is de-energized.

2. The device as set forth in claim 1 and wherein said electrothermal means comprises a U-shaped bimetal element having a portion of one of the legs thereof adjacent and engageable with a portion of one surface of said shunt means for movement of the latter in response to movement of the former in said one direction and means electrically insulating said portions.

3. The control as set forth in claim 1 and wherein said shunt means is connected to and movable with said switch means to shunt out said electrothermal means when said switch means moves in response to further movement of said electrothermal means in said one direction, after said phase winding has been de-energized.

4. A control for an electric motor including a phase winding and main winding; said control comprising a pair of normally closed electrical contacts connectable in series with said phase winding; thermally responsive electrically conducting means connectable in series with said main winding; a pair of normally open contacts connected in parallel with said thermally responsive means and connectable in series with said main winding for shunting out said thermally responsive means; electrically conductive spring means mounting one of said normally closed contacts for movement away from the other of said normally closed contacts in response to movement of said thermally responsive means in one direction upon the latter's being heated to a first predetermined amount by the flow of current therethrough, said spring means also mounting one of said normally open contacts for movement into engagement with the other of said normally open contacts in response to further movement of said thermally responsive means in said one direction upon the latter's being heated to another predetermined amount by the current flow therethrough to shunt out said entire thermally responsive means upon mutual engagement of said normally open contacts; a portion of said thermally responsive electrically conducting means overlying said spring means and being movable relative thereto and engaging said spring means to move said spring means in response to predetermined current flow conditions through said thermally responsive means; and electrically insulating means on at least one of said spring means and said thermally responsive means to provide insulation therebetween.

5. The control as set forth in claim 4 and wherein said electrically insulating means comprises an abutment formed of electrically insulating material mounted on one of said portions for engagement by the other of said portions.

6. The control as set forth in claim 4 and wherein said thermally responsive means comprises a U-shaped bimetal element having a portion of one of the legs thereof adjacent and engageable with a portion of one surface of said contact-carrying means for movement of the latter in response to movement of the former.

7. The control as set forth in claim 4 and having heater means for said thermally responsive means electrically connected therewith.

8. A thermal relay for an electric motor having a phase winding and a main winding; said thermal relay comprising an electrically conductive thermally responsive composite member; three electrical terminals; a pair of normally closed electrical contacts and a pair of normally open electrical contacts, one of said normally closed contacts being electrically connected to a first one of said terminals; electrically conductive spring switch means carrying the other of said normally closed contacts for movement into and out of engagement with said one of said normally closed contacts, and being biased into the normally closed-contact position; a portion of said switch means spaced from said other of said normally closed contacts and being electrically connected to a second one of said terminals; one of said normally open electrical contacts being electrically connected to the third one of said terminals; the other of said normally open contacts being electrically connected to and carried by said switch means for movement into and out of engagement with said one of said normally open contacts; said thermally responsive member being a bifurcated U-shaped element having legs whose ends are respectively electrically connected to said second and third terminals with the remainder of said thermally responsive member being movable upon being heated to a predetermined amount by the current flow therethrough; the movable portion of said thermally responsive member overlying at least a portion of said spring switch means and being operatively associated therewith to open said normally closed contacts in response to movement of said thermally responsive member upon the latter's being heated one predetermined amount by the current flow therethrough, said thermally responsive member moving said spring switch means a further distance to close said normally open contacts and thereby to shunt out said thermally responsive member in response to movement of the latter when the latter is heated another predetermined amount by the current flow therethrough; said first terminal being electrically connectable in series with said phase winding, one of said second and third terminals being electrically connectable in series with said main winding and the other of said second and third terminals being electrically connectable with one side of a power source.

9. A control device for an electric motor having a main and a phase winding; comprising three electrical terminals; a pair of normally closed electrical contacts and a pair of normally open electrical contacts, one of said normally closed contacts being electrically connected to a first one of said terminals; electrically conductive switch means electrically connected to and carrying the other of said normally closed contacts for movement into and out of engagement with said one of said normally closed contacts; a portion of said switch means spaced from said other of said normally closed contacts being electrically connected to a second one of said terminals, one of said normally open electrical contacts being electrically connected to the third one of said terminals, the other of said normally open contacts being carried by said switch means for movement into and out of engagement with said one of said normally open contacts; a U-shaped thermally responsive composite member having spaced portions adjacent the end of one of the legs thereof respectively electrically connected to and mounted on said second and third terminals, the free end of the other leg of said thermally responsive member being movable when said thermally responsive member is heated to a predetermined amount by the current flow therethrough, said switch means having a portion positioned with respect to said free end of said other leg and movable therewith to open said normally closed contacts in response to movement of said thermally responsive member upon the latter being heated to one predetermined amount by current flow therethrough and to thereafter close said normally open contacts and thereby shunt out said entire thermally responsive member when the latter is heated to another predetermined amount by the current flow therethrough; and means electrically insulating said portion of said switch means and said free end of said other leg.

10. The control device as set forth in claim 9 and wherein said portion of said switch means is so spaced with respect to said other of said normally open contacts as to effect a wiping action of said normally open contacts when said free end of said other leg of said thermally responsive member moves into engagement with said switch means and said thermally responsive member is heated to a predetermined amount.

11. A control device for an electric motor having a main and a phase winding, said control device comprising three electrical terminals; a pair of normally closed electrical contacts and a pair of normally open electrical contacts, one of said normally closed contacts being electrically connected to a first one of said terminals; an electrically conducting thermally responsive member comprising a U-shaped thermostat element having a portion of the body thereof bent into a return bight with said body portion overlying the legs of said element; electrically conducting switch means having one portion thereof electrically connected to a second one of said terminals; the other of said normally closed contacts being electrically connected to and mounted on said switch means for movement into and out of engagement with said one of said normally closed contacts in response to movement of said thermally responsive member; one of said normally open electrical contacts being electrically connected to the third one of said terminals, the other of said normally open contacts being electrically connected to and carried by said switch means for movement into and out of engagement with said one of said normally open contacts, said ends of the U-shaped thermally responsive member being respectively electrically connected to and mounted on said second and third terminals, said body portion overlying said switch means and being free for movement in response to heating by current flow therethrough to open said normally closed contacts at one heated condition, said switching means being operatively associated with and movable by the said body portion of said thermally responsive member to close said normally open contacts and thereby shunt out said entire thermally responsive member in response to movement thereof when the latter is at another heated condition.

12. A control device for an electric motor having a main and a phase winding; said control device comprising three electrical terminals; a pair of normally closed electrical contacts and a pair of normally open electrical contacts, one of said normally closed contacts being electrically connected to a first one of said terminals; an electrically conducting thermally responsive member; an electrically conductive switch member having a free end; said switch member, adjacent its other end, being electrically connected to and mounted on a second one of said terminals; said switch member being electrically connected to and carrying the other of said normally closed contacts for movement into and out of engagement with said one of said normally closed contacts; one of said normally open electrical contacts being electrically connected to the third one of said terminals; the other of said normally open contacts being mounted on and electrically connected to said switch member adjacent its free end for movement into and out of engagement with said one of said normally open contacts; said thermally responsive member having spaced portions adjacent one end thereof respectively electrically connected to and mounted on said second and third terminals, said thermally responsive member having a free end portion movable relative to and against a portion of said switch member adjacent its free end to move said switch member to open said normally closed contacts when said thermally responsive member is heated a first amount by current flow therethrough, and to further move said switch member to close said normally open contacts and thereby shunt out said entire thermally responsive member when the latter is heated a second amount; means electrically insulating said portions of said thermally responsive member and switch member, said portion of said switch member being so spaced with respect to said other of said normally open contacts as to effect a wiping action of said normally open contacts when said free end portion of said thermally responsive member moves into engagement with said switch member and said thermally responsive member is heated a predetermined amount.

References Cited in the file of this patent

UNITED STATES PATENTS

| | | |
|---|---|---|
| 1,755,564 | Shoenberg | Apr. 22, 1930 |
| 2,117,123 | Werner | May 10, 1938 |
| 2,280,960 | Lee | Apr. 28, 1942 |
| 2,284,383 | Elmer | May 26, 1942 |
| 2,367,985 | Weeks | Jan. 23, 1945 |
| 2,417,912 | Clark | Mar. 25, 1945 |
| 2,381,557 | Ray | Aug. 7, 1945 |
| 2,496,135 | Sedwitz | Jan. 31, 1950 |
| 2,805,302 | Reis | Sept. 3, 1957 |

FOREIGN PATENTS

| | | |
|---|---|---|
| 1,063,252 | France | Apr. 30, 1954 |